United States Patent
Iwahashi

(10) Patent No.: US 11,988,905 B2
(45) Date of Patent: May 21, 2024

(54) PHASE SHIFTER

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventor: Seita Iwahashi, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 189 days.

(21) Appl. No.: 17/829,153

(22) Filed: May 31, 2022

(65) Prior Publication Data
US 2022/0397780 A1    Dec. 15, 2022

(30) Foreign Application Priority Data

Jun. 9, 2021    (JP) .................................. 2021-096415

(51) Int. Cl.
*G02F 1/025* (2006.01)
(52) U.S. Cl.
CPC .................... *G02F 1/025* (2013.01)
(58) Field of Classification Search
CPC ................... G02F 1/025; G02F 1/2257; G02F 1/015–0159; G02F 1/017–01791
See application file for complete search history.

(56) References Cited

U.S. PATENT DOCUMENTS

| 10,101,630 B2 | 10/2018 | Watts et al. |
| 10,684,527 B2 * | 6/2020 | Watts ...................... G02F 1/225 |
| 2006/0285193 A1 | 12/2006 | Kimura et al. |

(Continued)

FOREIGN PATENT DOCUMENTS

| JP | 2020-027204 A | 2/2020 | |
| WO | WO-2018034322 A1 * | 2/2018 | ............. G02F 1/025 |

OTHER PUBLICATIONS

Machine translation of WO-2018034322-A1. (Year: 2018).*

*Primary Examiner* — Michelle R Connelly
*Assistant Examiner* — Emma R. Oxford
(74) *Attorney, Agent, or Firm* — POSZ LAW GROUP, PLC

(57) ABSTRACT

A phase shifter includes a substrate, waveguides and a wiring portion. The substrate includes optical waveguide regions and contact regions. Each contact region has contact portions. The waveguides are disposed at the substrate, and each of the waveguides accumulates carriers to modulate a phase of light for guiding propagation of the light. The wiring portion electrically connects each of the waveguides and each of the contact portions. Each of the contact portions connecting each of the waveguides to a corresponding one of electrodes to inject the carriers into each of the waveguides. Each of the waveguides has a lengthwise direction defined as a first direction, and a direction that is perpendicular to the first direction and is parallel to a surface of the substrate is defined as a second direction. The optical waveguide regions and the contact regions are disposed to be alternately aligned along the second direction.

12 Claims, 9 Drawing Sheets

(56) References Cited

U.S. PATENT DOCUMENTS

2012/0321240 A1* 12/2012 Alloatti .................. G02F 1/025
385/2
2015/0277159 A1  10/2015 Fujikata et al.
2018/0059504 A1*  3/2018 Mekis ....................... G02F 1/21
2021/0173237 A1*  6/2021 Lee ..................... G02B 6/2773

* cited by examiner

PHASE SHIFTER

CROSS REFERENCE TO RELATED APPLICATIONS

This application is based on Japanese Patent Application No. 2021-096415 filed on Jun. 9, 2021, the disclosure of which is incorporated herein by reference.

TECHNICAL FIELD

The present disclosure relates to a phase shifter.

BACKGROUND

A laser device such as a light detection and ranging (LiDAR) modulates respective phases of light emitted from waveguides that are aligned to control directivity of the light as a whole.

SUMMARY

The present disclosure describes a phase shifter including a substrate and waveguides.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
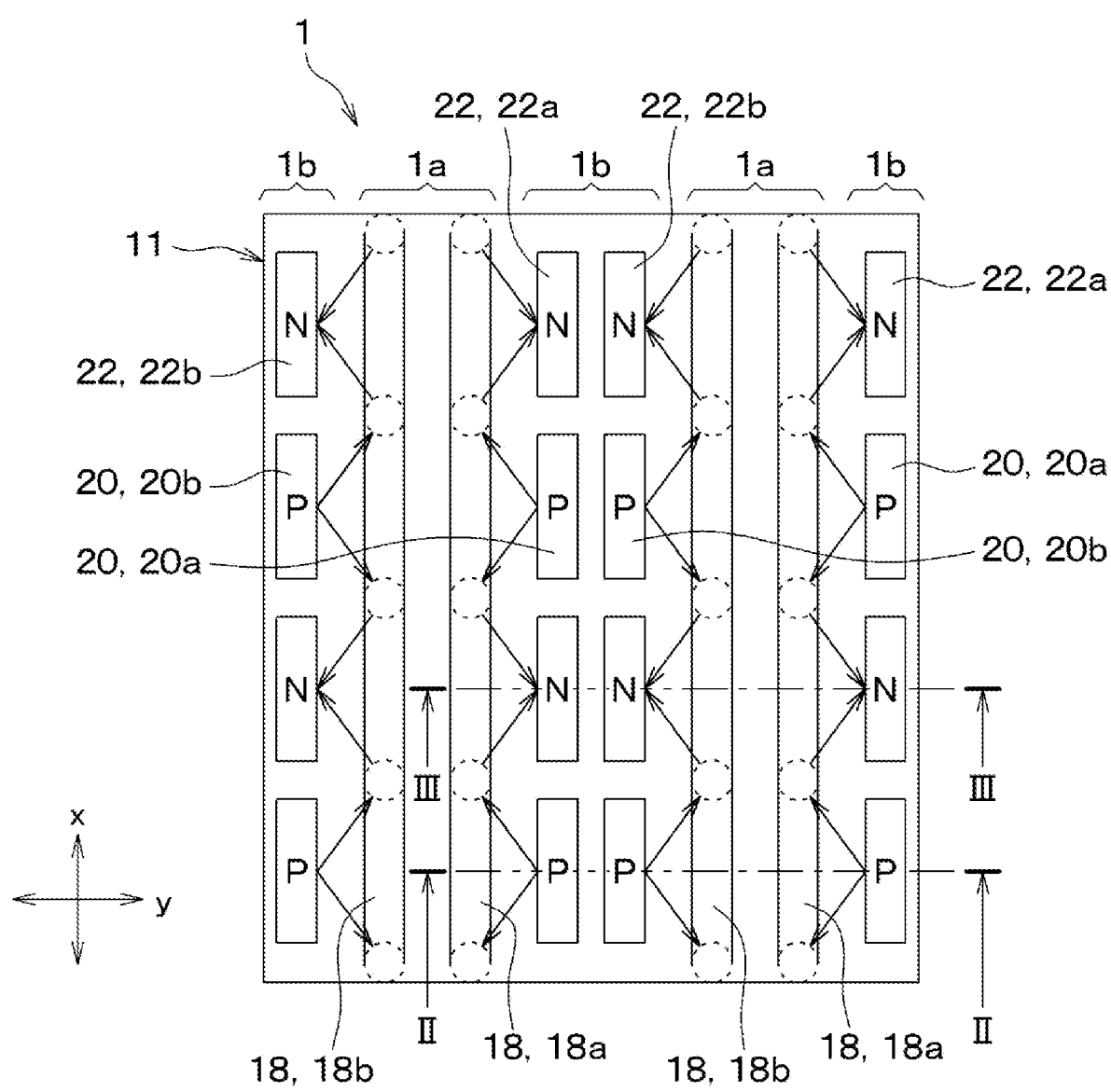
FIG. 1 is a top view of a phase shifter according to a first embodiment.

In a laser device, a phase shifter may be adopted for adjusting an optical phase by changing a refractive index of each of the waveguides. In the laser device having such a phase shifter, the upper limit of a light emission angle becomes larger as a pitch between the waveguides become smaller.

For example, the phase shifter may accumulate carriers in each of the waveguides to change directivity of each of the waveguides by applying a voltage to an electrode connected to each of the waveguides. In the phase shifter, a waveguide region and a contact region are alternately arranged. The waveguide region includes the waveguide. The contact region includes an electrode and a contact portion that connects the electrode to the waveguide. Only one waveguide is formed in each of the waveguide regions. The electrodes are arranged in a row along the waveguide in each contact region.

The distance between the waveguide and the electrode may be required to be widened to some extent to prevent the light propagating in the waveguide from being absorbed to an adjacent electrode. Therefore, in the structure in which the waveguides and the electrodes are alternately aligned, the upper limit of the emission angle becomes smaller as the pitch between the waveguides becomes larger.

According to an aspect of the present disclosure, a phase shifter includes a substrate, waveguides, and a wiring portion. The substrate includes optical waveguide regions and contact regions. Each of the contact regions has contact portions. The waveguides are disposed at the substrate, and each of the waveguides accumulates carriers to modulate a phase of light for guiding propagation of the light. The wiring portion electrically connects each of the waveguides and each of the contact portions. Each of the contact portions connecting one of the waveguides to one of electrodes to inject the carriers into the one of the waveguides. Each of the waveguides has a lengthwise direction defined as a first direction, and a direction that is perpendicular to the first direction and is parallel to a surface of the substrate is defined as a second direction. The optical waveguide regions and the contact regions are disposed to be alternately aligned along the second direction. Two of the waveguides are disposed at each of the optical waveguide regions, and the two of the waveguides are respectively a first waveguide and a second waveguide. The first waveguide is adjacent to one of the contact regions at a side of each of the optical waveguide regions facing the second direction, and the second waveguide is adjacent to another one of the contact regions at another side of each of the optical waveguide regions facing the second direction. Each of the contact regions includes a first p-type contact portion as one of the contact portions made of a p-type semiconductor, a first n-type contact portion as one of the contact portions made of an n-type semiconductor, a second p-type contact portion as one of the contact portions made of the p-type semiconductor, and a second n-type contact portion as one of the contact portions made of the n-type semiconductor. The first p-type contact portion and the first n-type contact portion are connected to one of the electrodes to inject the carriers into the first waveguide, and the second p-type contact portion and the second n-type contact portion are connected to another one of the electrodes to inject the carriers into the second waveguide.

Since optical loss due to optical coupling between the waveguides is smaller than optical loss due to the electrode's light absorption, it is possible to reduce the distance between the waveguides to be smaller than the distance between the waveguide and the electrode. Therefore, it is possible to reduce the pitch per waveguide by aligning the waveguides, the p-type contact portion and the n-type contact portion so that two waveguides are adjacent to each other. The pitch per waveguide corresponds to the distance between adjacent two of the waveguides.

The following describes several embodiments with reference to the drawings. In the following embodiments, the same or equivalent parts are denoted by the same reference numerals as each other, and explanations will be provided to the same reference numerals.

First Embodiment

The following describes a first embodiment. A phase shifter 1 according to the first embodiment with reference to FIG. 1 changes a refractive index of a waveguide by accumulating carriers in each of waveguides to adjust a phase of light propagating in each of the waveguides. The phase shifter 1 is adopted for adjusting a direction of emitted light in a laser device such as LiDAR.

The phase shifter 1 includes the waveguides for guiding propagation of the light and electrodes respectively for injecting carriers into the waveguides. As shown in FIG. 1, the phase shifter 1 includes an optical waveguide region 1a and a contact region 1b over a substrate 11 described hereinafter. The optical waveguide region 1a has the waveguides. The contact region 1b has contact portions respectively for connecting the electrodes to the waveguides.

Figure 2:
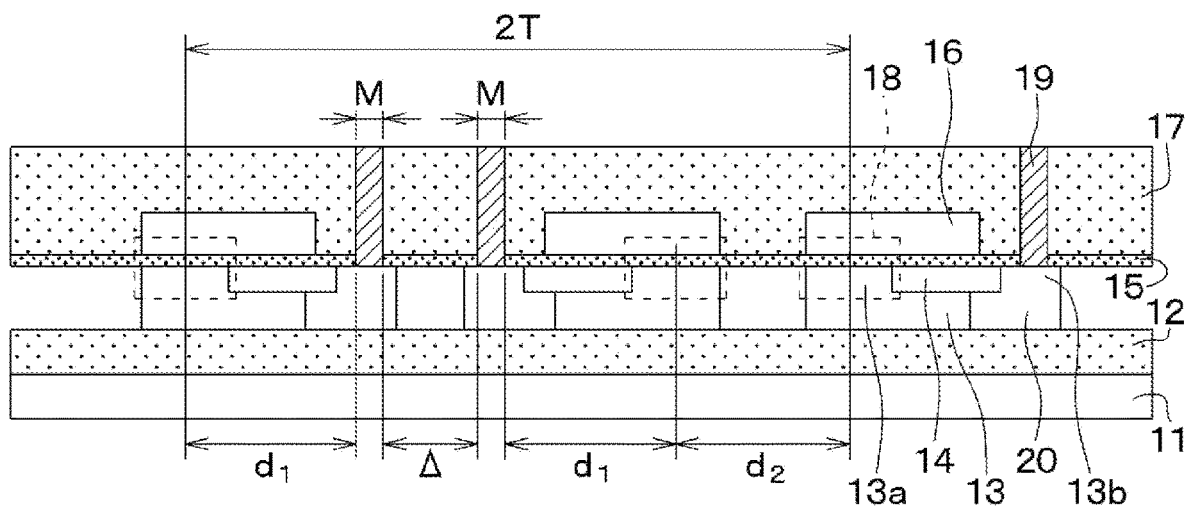
FIG. 2 is a cross-sectional view taken along line II-II in FIG. 1.
Figure 3:
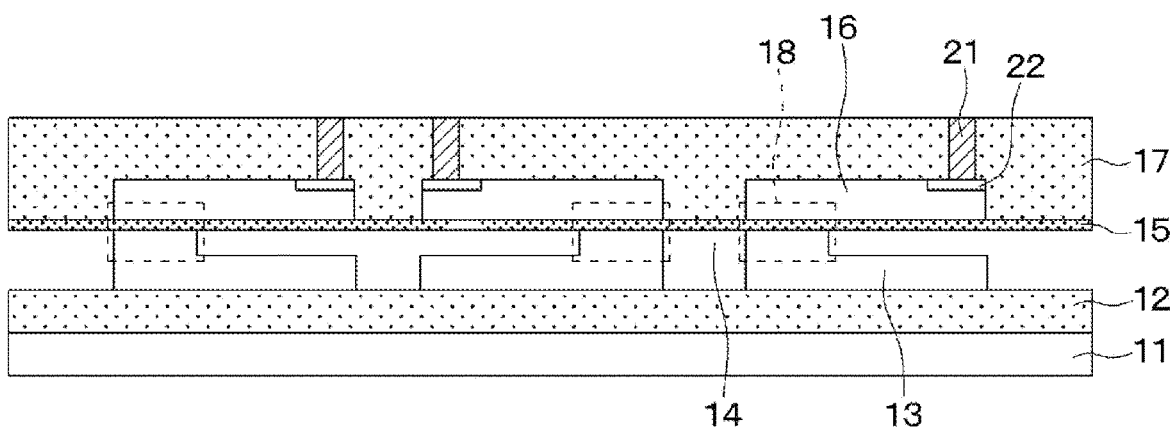
FIG. 3 is a cross-sectional view taken along a line III-III in FIG. 1.

As shown in FIGS. 2, 3, the phase shifter 1 includes the substrate 11, an insulation layer 12, a p-type semiconductor layer 13, a clad layer 14, an insulation layer 15, an n-type semiconductor layer 16, an insulation layer 17, a waveguide 18, a p-type electrode 19, a p-type contact portion 20, an n-type electrode 21, and an n-type contact portion 22.

The substrate 11 is made of silicon. The insulation layer 12 made of, for example, silicon oxide ($SiO_2$) is formed at a top surface of the substrate 11. The p-type semiconductor layer 13 is formed at the top surface of the insulation layer 12. The p-type semiconductor layer 13 is made of p-type silicon formed by doping silicon with p-type impurities. Alternatively, the p-type semiconductor layer 13 is made of p-type silicon germanium (SiGe).

The p-type semiconductor layer 13 is divided into multiple regions with the clad layer 14 interposed between adjacent two of the regions of the p-type semiconductor layer 13. Each of the multiple regions of the p-type semiconductor layer 13 is extended along a direction (hereinafter referred to as an x-direction) parallel to the top surface of the substrate 11. The clad layer 14 is an air clad. The x-direction corresponds to a first direction.

Each of the regions in the p-type semiconductor layer 13 is provided with ribs. Each of the ribs has a cross-sectional surface perpendicular to the x-direction that is formed in a rectangular shape. In the cross-sectional surface shown in FIG. 2, the ribs are respectively formed at both end portions of each of the regions in the p-type semiconductor layer 13. One of the ribs respectively at the both end portions extends in the x-direction, and the other one of the ribs is formed to be scattered along the x-direction. One of the ribs is a rib 13a, and the other one of the ribs is a rib 13b. An insulation layer 15 is formed at a top surface of the p-type semiconductor layer 13 to be supported by the ribs 13a, 13b. The insulation layer 15 is made of, for example, aluminum oxide ($Al_2O_3$).

The n-type semiconductor layer 16 is formed at the top surface of the insulation layer 15. The n-type semiconductor layer 16 is made of an n-type III-V compound semiconductor. For example, the n-type semiconductor layer 16 is made of indium phosphide (InP) or indium gallium arsenic phosphorus (InGaAsP). Alternatively, the n-type semiconductor layer 16 is made of n-type silicon. The III-V compound semiconductor may also be referred to as a 111-V group semiconductor.

The n-type semiconductor layer 16 corresponds to the p-type semiconductor layer 13, and is divided into multiple regions. A portion of the top surface of the insulation layer 15 is exposed from the n-type semiconductor layer 16. The insulation layer 17 is formed at a top surface and a side surface of the n-type semiconductor layer 16, and is formed at the top surface of the insulation layer 15 exposed from the n-type semiconductor layer 16. The insulation layer 17 is made of, for example, silicon oxide ($SiO_2$). The regions of the n-type semiconductor layer 16 are insulated by the insulation layer 17. The regions of the n-type semiconductor layer 16 faces respective regions of the p-type semiconductor layer 13 with the insulation layer 15 interposed between each of the regions of the n-type semiconductor layer 16 and each of the regions of the p-type semiconductor layer 13.

As illustrated in FIG. 2, a portion of the n-type semiconductor layer 16 faces the rib 13a with the insulation layer 15 interposed between the portion of the n-type semiconductor layer 16 and the rib 13a. The waveguide 18 includes the rib 13a, the insulation layer 15 interposed between the rib 13a and the n-type semiconductor layer 16, and the portion of the n-type semiconductor layer 16 facing the rib 13a. The waveguide 18 through which the light propagates has a lengthwise direction as the x-direction. As described above, the waveguide 18 is a rib waveguide made of the rib 13a.

An opening for exposing the rib 13b is formed at a portion of the insulation layer 15 located at the top portion of the rib 13b. A trench for exposing the opening is formed at the insulation layer 17. The trench is filled with conductive material such as aluminum to form the p-type electrode 19.

The p-type electrode 19 is adopted for connecting the p-type semiconductor layer 13 to a power supply (not shown). Holes are accumulated in the waveguide 18 by applying a voltage from the power supply to the p-type electrode 19. The rib 13b and the bottom part of the rib 13b included in the p-type semiconductor layer 13 is made as the p-type contact portion 20 doped with p-type impurities with higher concentration. The p-type contact portion 20 connects the waveguide 18 to the p-type electrode 19. The portion of the p-type semiconductor layer 13 connecting the waveguide 18 and the p-type contact portion 20 is made as a wiring portion for connecting the waveguide 18 and the p-type contact portion 20 electrically.

As illustrated in FIG. 3, a trench for exposing a portion of the n-type semiconductor layer 16 is formed at the insulation layer 17. The conductive material such as aluminum is filled in the trench to form the n-type electrode 21. The n-type electrode 21 is formed at a portion separated from the p-type electrode 19 above the substrate 11.

The n-type electrode 21 is adopted for connecting the n-type semiconductor layer 16 to a power supply (not shown). Electrons are accumulated in the waveguide 18 by applying a voltage from the power supply to the n-type electrode 21. The portion of the n-type semiconductor layer 16 located at the bottom portion of the n-type electrode 21 is made as the n-type contact portion 22 doped with n-type impurities with higher concentration. The n-type contact portion 22 is adopted for connecting the waveguide 18 to the n-type electrode 21. The portion of the n-type semiconductor layer 16 connecting the waveguide 18 and the n-type contact portion 22 is made as a wiring portion for connecting the waveguide 18 and the n-type contact portion 22 electrically.

In the phase shifter 1, when a voltage is applied to the p-type electrode 19 and the n-type electrode 21, the holes are accumulated in the portion of the rib 13a in contact with the insulation layer 15 in the waveguide 18, and the electrons are accumulated in the portion of the n-type semiconductor layer 16 in contact with the insulation layer 15 in the waveguide 18. As a result, the refractive index of the waveguide 18 changes, and the phase of the light propagating through the waveguide 18 changes.

As shown in FIG. 1, the phase shifter 1 includes multiple optical waveguide regions 1a and multiple contact regions 1b. Each of the optical waveguide regions 1a includes the waveguides 18. Each of the contact regions 1b includes the p-type electrode 19, the p-type contact portion 20, the n-type electrode 21 and the n-type contact portion 22. FIG. 1 omits the illustration of, for example, the insulation layer 17, the p-type electrode 19 and the n-type electrode 21.

Each of the optical waveguide regions 1a includes two optical waveguides 18 arranged in parallel to each other. The optical waveguide regions 1a and the contact regions 1b are alternately arranged along a direction (hereinafter referred to as a y-direction) parallel to the top surface of the substrate 11 and perpendicular to the x-direction. The y-direction corresponds to a second direction.

With regard to the two waveguides 18 included in each of the optical regions 1a, one of the waveguides 18 adjacent to the contact region 1b at a side of each of the optical regions 1a facing the y-direction is defined as a first waveguide 18a, and the other one of the waveguides 18 adjacent to the contact region 1b at another side of each of the optical regions 1a facing the y-direction is defined as a second waveguide 18b.

The p-type contact portion 20 connected to the p-type electrode 19 for accumulating the carriers in the first waveguide 18a is defined as a first p-type contact portion 20a. The n-type contact portion 22 connected to the n-type electrode 21 for accumulating the carriers in the first waveguide 18a is defined as a first n-type contact portion 22a. The p-type contact portion 20 connected to the p-type electrode 19 for accumulating the carriers in the second waveguide 18b is defined as a second p-type contact portion 20b. The n-type contact portion 22 connected to the n-type electrode 21 for accumulating the carriers in the second waveguide 18b is defined as a second n-type contact portion 22b.

In FIG. 1, each of dotted circles above the waveguide 18 indicates a region where the light is modulated. An arrow connecting each of the dotted circles and the p-type contact portion 20 and an arrow connecting each of the dotted circles and the n-type contact portion 22 indicate the flow of carriers.

Each of the contact regions 1b includes the first p-type contact portion 20a, the second p-type contact portion 20b, the first n-type contact portion 22a and the second n-type contact portion 22b.

Each of the contact regions 1b includes several parts of the first p-type contact portion 20a, several parts of the second p-type contact portion 20b, several parts of the first n-type contact portion 22a and several parts of the second n-type contact portion 22b. In a single contact region 1b, the first p-type contact portion 20a and the first n-type contact portion 22a are alternately aligned in a row along the x-direction at a side of the contact region 1b. The second p-type contact portion 20b and the second n-type contact portion 22b are alternately aligned in a row along the x-direction to be adjacent to the row of the first p-type contact portion 20a and the first n-type contact portion 22a at the other side of the contact region 1b.

Figure 4:
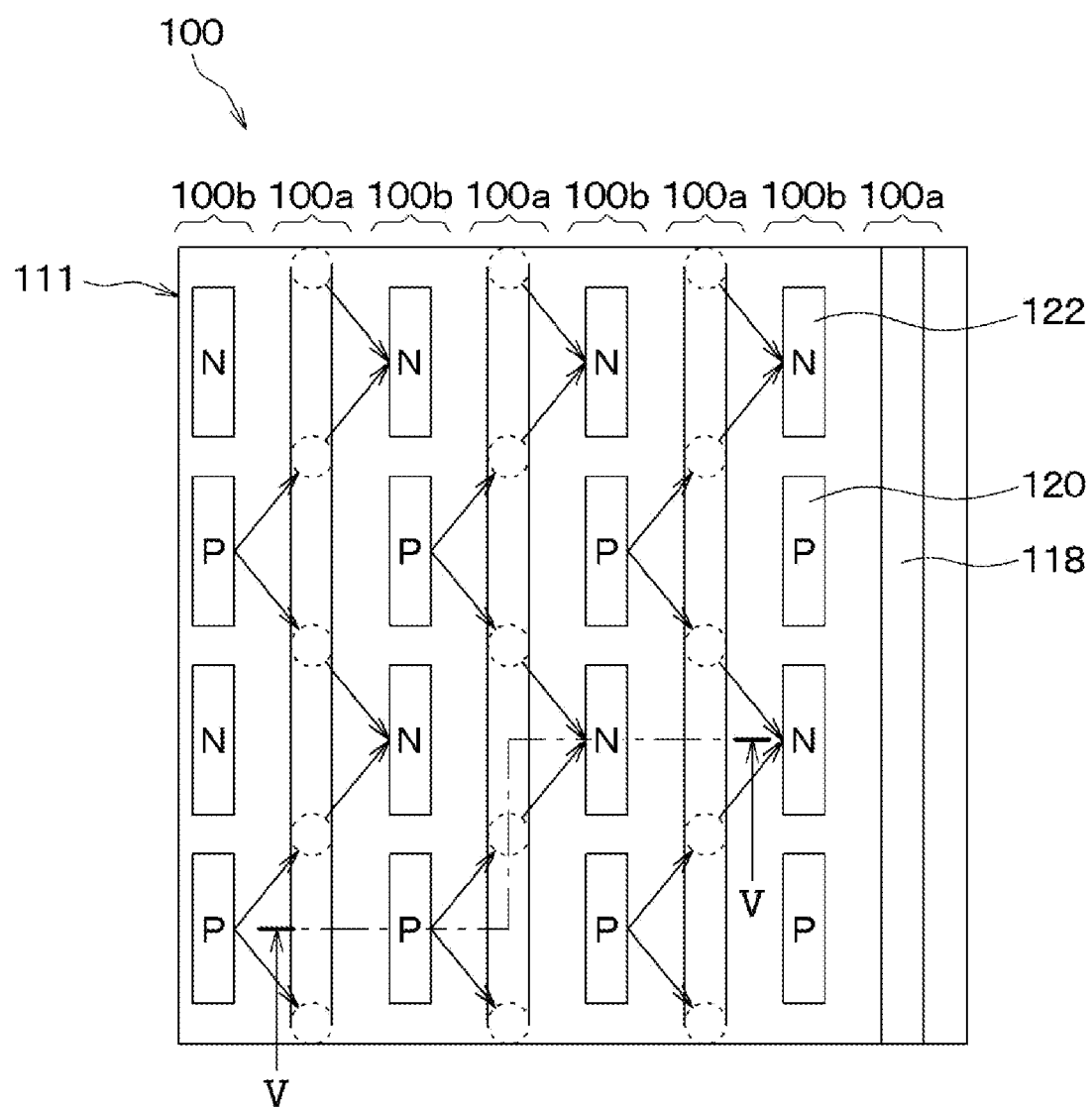
FIG. 4 is a top view of a phase shifter according to a comparative example.

The following describes the advantageous effects attained in the present embodiment. In a phase shifter 100 according to a comparative example shown in FIG. 4, each of optical waveguide regions 100a includes a single waveguide 118. In a single contact region 100b, a p-type contact portion 120, an n-type contact portion 122 are alternately aligned in a row. The p-type contact portion 120 and the n-type contact portion 122 corresponding to the single waveguide 118 are respectively arranged at one side and the other side of the waveguide 118.

Figure 5:
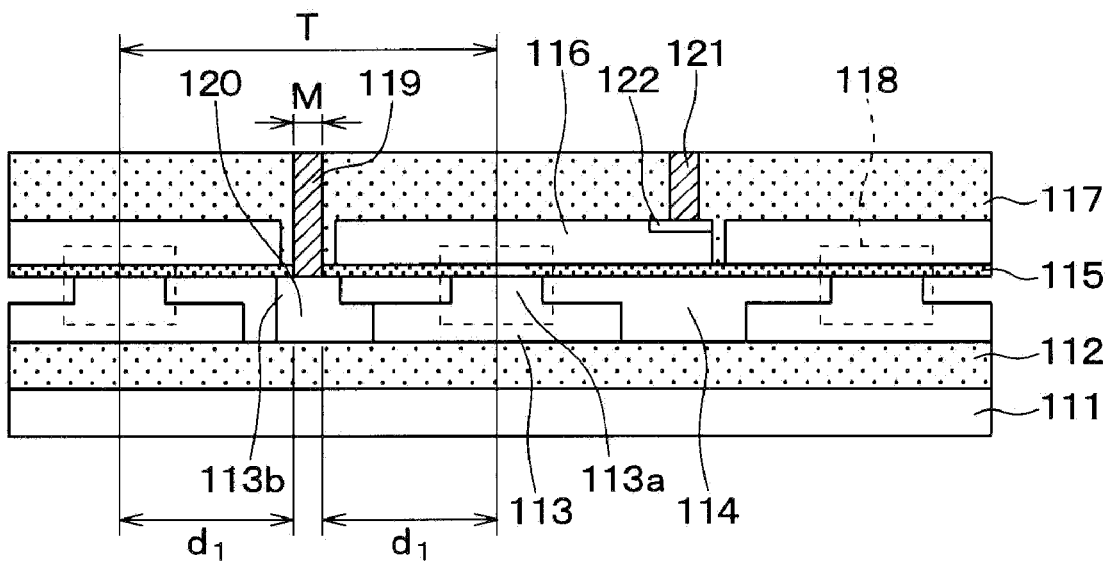
FIG. 5 is a cross-sectional view taken along a line V-V in FIG. 4 with reference to a vertical phase shifter according to the comparative example.
Figure 6:
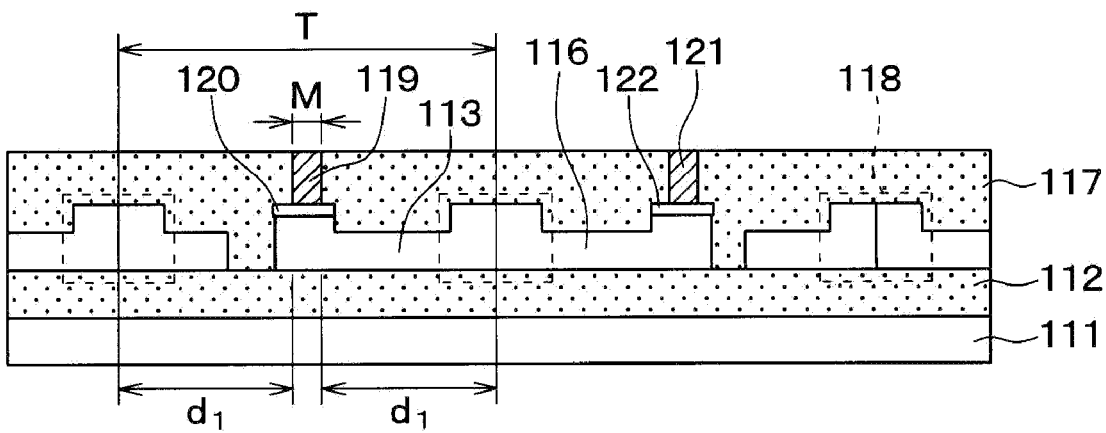
FIG. 6 is a cross-sectional view taken along a line V-V in FIG. 4 with reference to a horizontal phase shifter according to the comparative example.

The optical waveguide region 100a and the contact region 100b may be arranged as illustrated in FIGS. 5 and 6. The comparative example illustrated in FIG. 5 is a vertical phase shifter for accumulating the carriers in the waveguide to change the refractive index of the waveguide, as similar to the one according to the present embodiment. The phase shifter 100 includes a substrate 111, an insulation layer 112, a p-type semiconductor layer 113, a clad layer 114, an insulation layer 115, an n-type semiconductor layer 116, an insulation layer 117, a waveguide 118, a p-type electrode 119, a p-type contact portion 120, an n-type electrode 121, and an n-type contact portion 122.

The insulation layer 112 is formed at a top surface of the substrate 111, and the p-type semiconductor layer 113 is formed at the top surface of the insulation layer 112. The p-type semiconductor layer 113 is divided into multiple regions with the clad layer 114 interposed between adjacent two of the regions. Each of the multiple regions of the p-type semiconductor layer 13 is extended along one direction parallel to the top surface of the substrate 111. Each of the regions of the p-type semiconductor layer 113 has a rib 113a and a rib 113b. An insulation layer 115 is formed at a top surface of the p-type semiconductor layer 113 to be supported by the ribs 113a, 113b.

The n-type semiconductor layer 116 is formed at the top surface of the insulation layer 115. The n-type semiconductor layer 116 corresponds to the p-type semiconductor layer 113, and is divided into several regions. The insulation layer 117 is formed at a top surface and a side surface of the n-type semiconductor layer 116, and is formed at the top surface of the insulation layer 115 exposed from the n-type semiconductor layer 116. The regions of the n-type semiconductor layer 116 are insulated by the insulation layer 117. The regions of the n-type semiconductor layer 116 faces respective regions of the p-type semiconductor layer 113 with the insulation layer 115 interposed between each of the regions of the n-type semiconductor layer 116 and each of the regions of the p-type semiconductor layer 113. The waveguide 118 includes the rib 113a, the insulation layer 115 interposed between the rib 13a and the n-type semiconductor layer 116, and the portion of the n-type semiconductor layer 116 facing the rib 113a.

The p-type electrode 119 is formed at a top portion of the rib 113b. The rib 113b and a bottom portion of the rib 113b included in the p-type semiconductor layer 113 is made as a p-type contact portion 120. The n-type electrode 121 is formed at a portion separated from the p-type electrode 119 above the substrate 111. The portion of the n-type semiconductor layer 116 located at the bottom portion of the n-type electrode 121 is made as the n-type contact portion 122.

The comparative example illustrated in FIG. 6 is a horizontal phase shifter for extracting the carriers from the waveguide to change the refractive index of the waveguide. In the phase shifter 100, the p-type semiconductor layer 113 and the n-type semiconductor layer 116 are formed above the insulation layer 112. The p-type semiconductor layer 113 and the n-type semiconductor layer 116 are respectively divided into several regions. Each of the regions of the respective p-type semiconductor layer 113 and the n-type semiconductor layer 116 includes ribs provided at both ends of each of the regions in another one direction perpendicular to the above-mentioned one direction that is parallel to the top surface of the substrate 111.

One of the ribs included in the p-type semiconductor layer 113 and one of the ribs included in the n-type semiconductor layer 16 are connected to each other, and the waveguide 118 is formed by this connected portion. The p-type electrode 119 is formed at the top portion of the rib included in the p-type semiconductor layer 113 at a side facing the waveguide 118, and a portion of this rib is made as the p-type contact portion 120. The n-type electrode 121 is formed at the top portion of the rib included in the n-type semiconductor layer 116 at a side facing the waveguide 118, and a portion of this rib is made as the n-type contact portion 122.

In the phase shifter with such a structure, when a voltage is applied to the p-type electrode 119 and the n-type electrode 121 through a power supply (not shown), the carriers are extracted from the waveguide 118. As a result, the refractive index of the waveguide 118 changes, and the phase of the light propagating through the waveguide 118 changes.

In each of FIGS. 5, 6, the pitch T of the waveguide satisfies a mathematical relation of $T=2d_1+M$, where $d_1$ denotes a distance between the waveguide and the electrode in the other one direction, and a distance between the waveguide 118 and the p-type electrode 119 or the n-type electrode 121 in the phase shifter 100, and M denotes a width of the electrode in the second direction, and denotes a width of the p-type electrode 119 and a width of the n-type electrode 121 in the phase shifter 100.

In contrast, in the present embodiment, the pitch T per waveguide 18 satisfies a mathematical relation of $T=d_1+M+(d_2+\Delta)/2$, where $d_1$ denotes a distance between the waveguide 18 and p-type electrode 19 or the n-type electrode 21, $d_2$ denotes a distance between the first waveguide 18a and the second waveguide 18b included in the single optical waveguide region 1a along the y-direction, and $\Delta$ denotes a distance between either the p-type electrode 19 above the first p-type contact portion 20a or the n-type electrode 21 above the first n-type contact portion 22a and either the p-type electrode 19 above the second p-type contact portion 20b or the n-type electrode above the second n-type contact portion 22b along the y-direction.

The distance $d_1$ may be required to be widened to some extent to prevent the light propagating in the waveguide from being absorbed to an adjacent electrode, and may be set, for example, about 1000 nanometers (nm). Since the optical loss due to optical coupling between the waveguides is smaller than the optical loss due to light absorption through the electrodes, the distance $d_2$ may be set to be smaller than the distance $d_1$. For example, the distance $d_2$ may be set, for example, about 800 nanometers (nm). The lower limit of the distance $\Delta$ is determined by the process factor; however, this can also be made smaller than the distance $d_1$. The lower limit of the distance $\Delta$ may be set, for example, about 100 nanometers (nm). The lower limit of the width M is determined by the process factor, and may be set, for example, about 100 nanometers (nm).

In the present embodiment, the pitch T can be set smaller than the pitch T in the comparative example. The laser device such as LiDAR controls the directivity of the entire light by adjusting the phases of light emitted from the waveguides that are aligned. The laser device is set to satisfy a mathematical relation of $\sin \psi=\lambda/2T$, where $\psi$ denotes the upper limit of the light emission angle, and $\lambda$ denotes the wavelength of light. In other words, the upper limit of the emission angle increases as the pitch T decreases. Therefore, in the present embodiment, the upper limit $\psi$ can be enlarged in comparison with the comparative example.

In the present embodiment, a single optical waveguide region 1a includes two waveguides 18 that are arranged in parallel to each other. A single contact region 1b includes the first p-type contact portion 20a, the second p-type contact portion 20b, the first n-type contact portion 22a and the second n-type contact portion 22b. As the waveguide 18, the p-type contact portion 20 and the n-type contact portion 22 are aligned to allow the two waveguides 18 to be adjacent to each other, the pitch T per waveguide 18 can be set smaller to widen the range of light emission angle.

According to the above embodiment, it is possible to attain the following advantageous effects.

Each of the contact regions 1b includes several parts of the first p-type contact portion 20a, several parts of the second p-type contact portion 20b, several parts of the first n-type contact portion 22a and several parts of the second n-type contact portion 22b. The first p-type contact portion 20a and the first n-type contact portion are alternately aligned in a row along the x-direction, and the second p-type contact portion 20b and the second n-type contact portion 22b are alternately aligned in a row along the x-direction. For example, it is possible to align two waveguides 18 to be adjacent to each other.

The p-type semiconductor layer 13 connects the waveguide 18, the first p-type contact portion 20a, the second p-type contact portion 20b. The p-type semiconductor layer 13 is made of p-type silicon-germanium (SiGe). As a result, it is possible to attain high-speed modulation.

The n-type semiconductor layer 16 connects the waveguide 18, the first n-type contact portion 22a, and the second n-type contact portion 22b. The n-type semiconductor layer 16 is made of an n-type III-V compound semiconductor, in particular, indium phosphide (InP) or indium gallium arsenide phosphide (InGaAsP). As a result, it is possible to reduce the optical loss to enhance the modulation efficiency in comparison with the n-type semiconductor layer 16 made of silicon.

Alternatively, the n-type semiconductor layer 16 is made of n-type silicon. As a result, it is possible to enhance mass productivity.

The waveguide 18 is a rib waveguide. The clad layer 14 that divides the waveguide 18 into several waveguides is an air clad. By making the clad layer 14 as the air clad, it is possible to reduce optical leakage from the waveguide 18.

The waveguide 18 includes the p-type semiconductor layer 13, the n-type semiconductor layer 16 and the insulation layer 15. The p-type semiconductor layer 13 is made of the p-type semiconductor. The n-type semiconductor layer 16 is made of the n-type semiconductor. The insulation layer 15 is disposed between the p-type semiconductor layer 13 and the n-type semiconductor layer 16. It is possible to reduce power consumption of the phase shifter 1 by changing the refractive index of the waveguide 18 through accumulating the carriers in the waveguide 18.

Second Embodiment

The following describes a second embodiment. The present embodiment is obtained by changing the arrangement of the p-type electrode 19, the p-type contact portion 20, the n-type electrode 21 and the n-type contact portion 22 in the first embodiment, and the other configuration is the similar to the first to third embodiments, and therefore only the portions different from the first embodiment will be described in the following.

Figure 7:
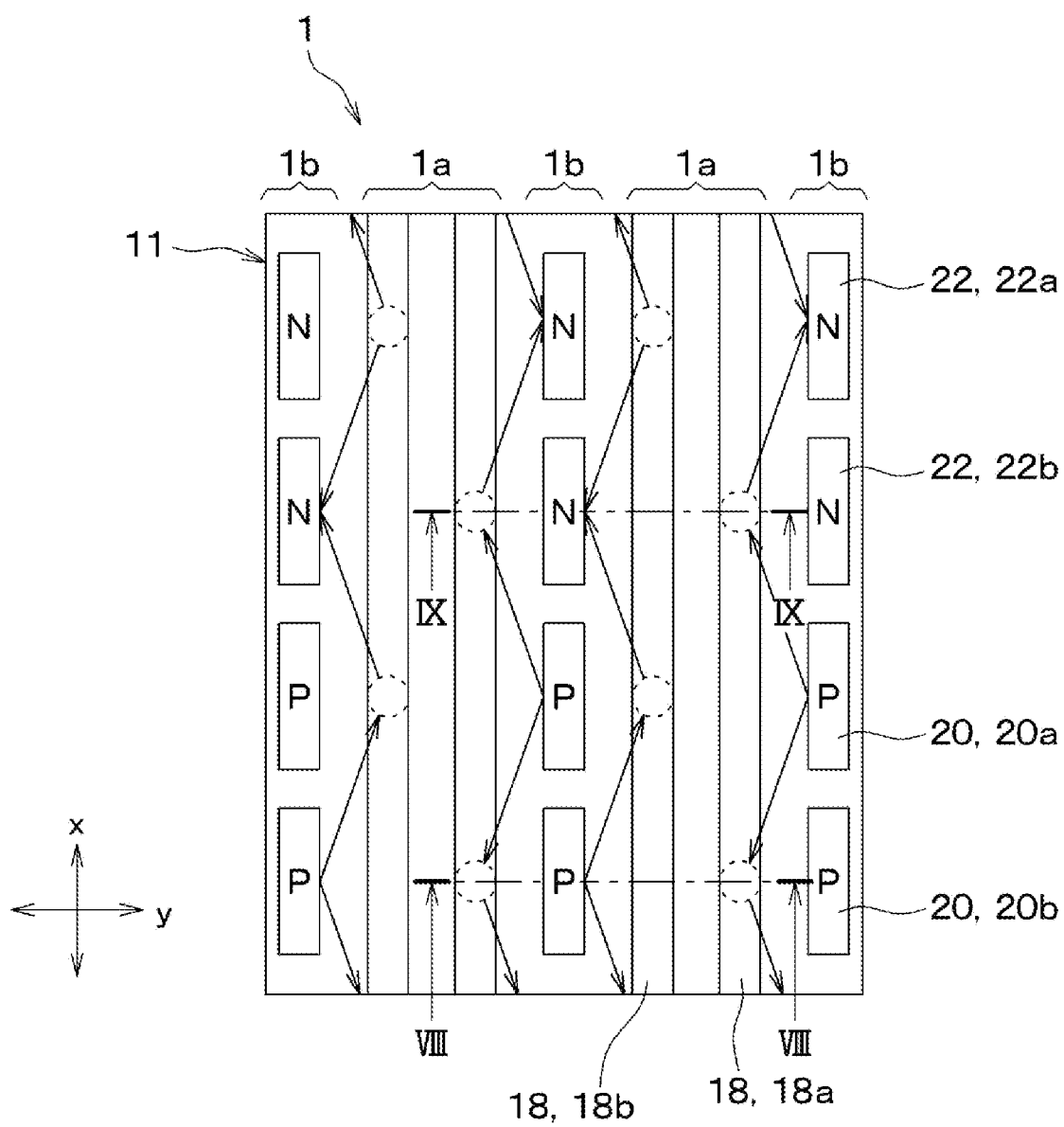
FIG. 7 is a top view of a phase shifter according to a second embodiment.

As illustrated in FIG. 7, in the present embodiment, the first p-type contact portion 20a, the second p-type contact portion 20b, the first n-type contact portion 22a, and the second n-type contact portion 22b in this sequential order are aligned in a row along the x-direction.

Figure 8:
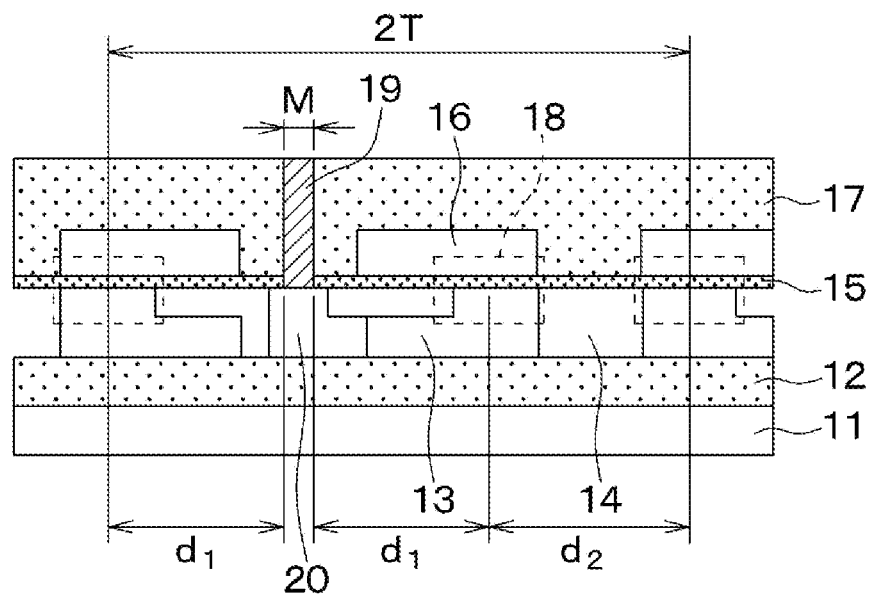
FIG. 8 is a cross-sectional view taken along line VIII-VIII in FIG. 7.
Figure 9:
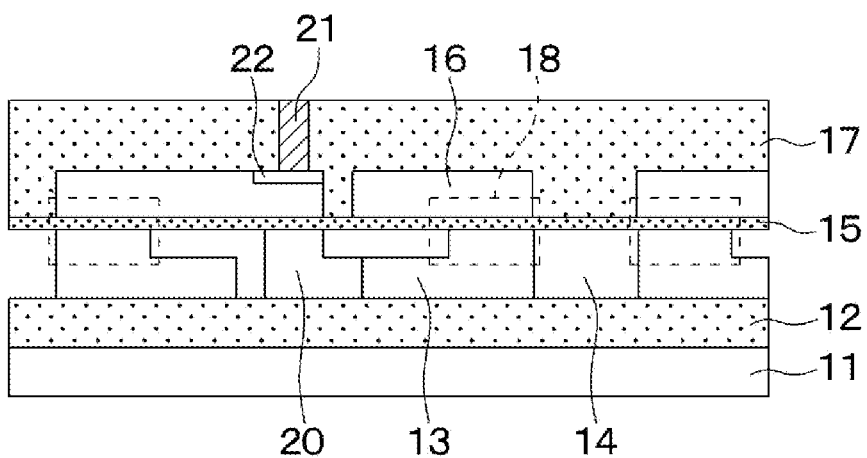
FIG. 9 is a cross-sectional view taken along line IX-IX in FIG. 7.

As illustrated in FIGS. 7 to 9, the first waveguide 18a and the second waveguide 18b are arranged to sandwich one electrode along the y-direction. According to such an arrangement, the pitch T per waveguide 18 satisfies a mathematical relation of $T=d_1+M/2+d_2/2$, and is smaller than the pitch T described in the first embodiment.

In the present embodiment, it is possible to attain the advantageous effects as similar to the advantageous effects in the first embodiment with the configuration and operation identical to the ones in the first embodiment.

According to the above embodiment, it is possible to attain the following advantageous effects.

The first p-type contact portion 20a, the second p-type contact portion 20b, the first n-type contact portion 22a, and the second n-type contact portion 22b in this sequential order are aligned in a row along the x-direction. Thereby, it is possible to further reduce the pitch T.

Third Embodiment

The following describes a third embodiment. The present embodiment is obtained by changing the arrangement of the p-type electrode 19, the p-type contact portion 20, the n-type electrode 21 and the n-type contact portion 22 in the second embodiment, and the other configuration is the similar to the second embodiment, and therefore only the portions different from the second embodiment will be described in the following.

Figure 10:
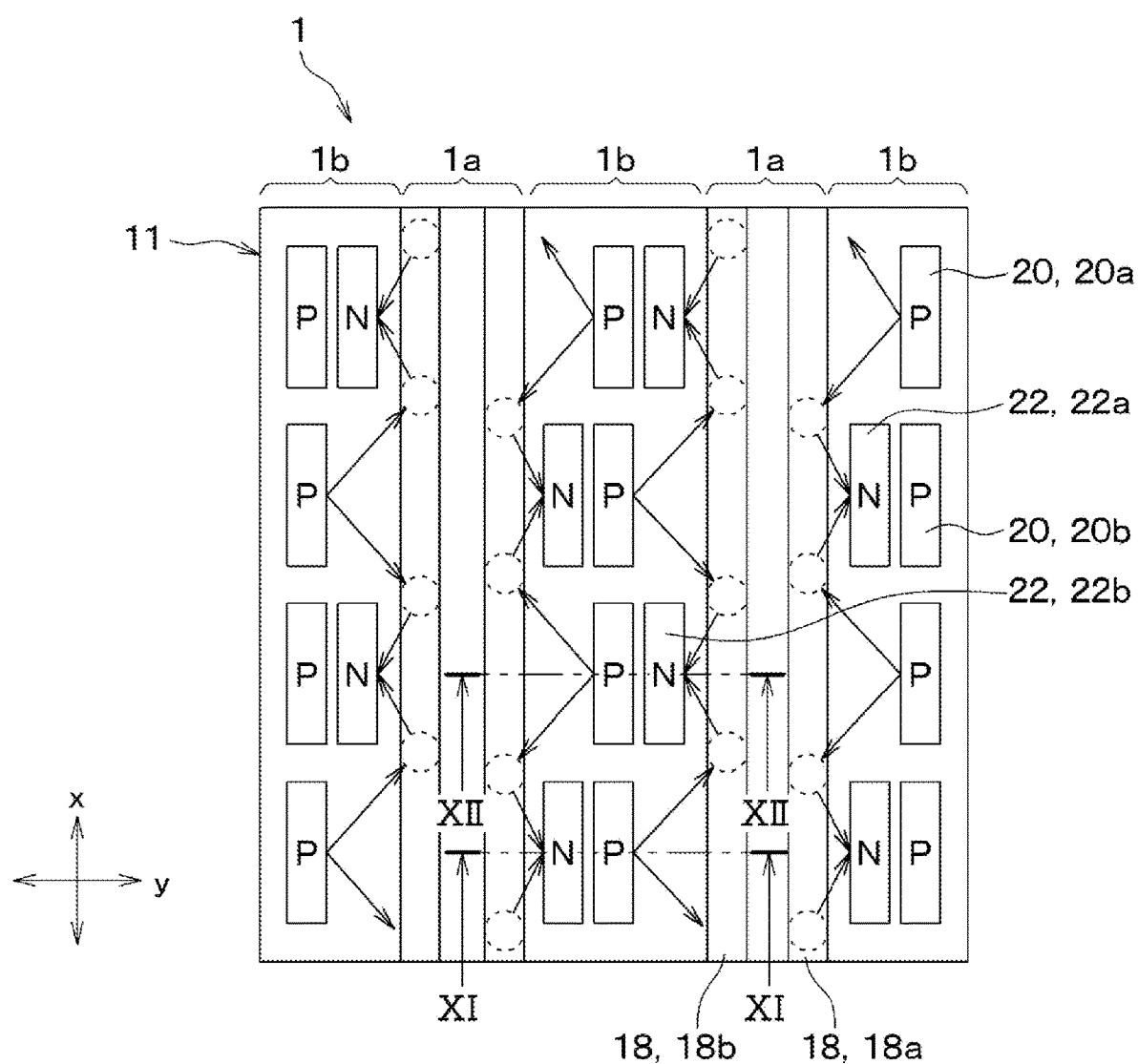
FIG. 10 is a top view of a phase shifter according to a third embodiment.

As illustrated in FIG. 10, in the present embodiment, the first p-type contact portion 20a and the second p-type contact portion 20b are alternately aligned in a row along the x-direction.

The first n-type contact portion 22a is arranged between the first waveguide 18a and a row of the first p-type contact portion 20a and the second p-type contact portion 20b, such that the first n-type contact portion 22a is adjacent to the second p-type contact portion 20b at one side facing the y-direction.

The second n-type contact portion 22b is arranged between the second waveguide 18b and a row of the first p-type contact portion 20a and the second p-type contact portion 20b, such that the second n-type contact portion 22b is adjacent to the first p-type contact portion 20a at another one side facing the y-direction.

Figure 11:
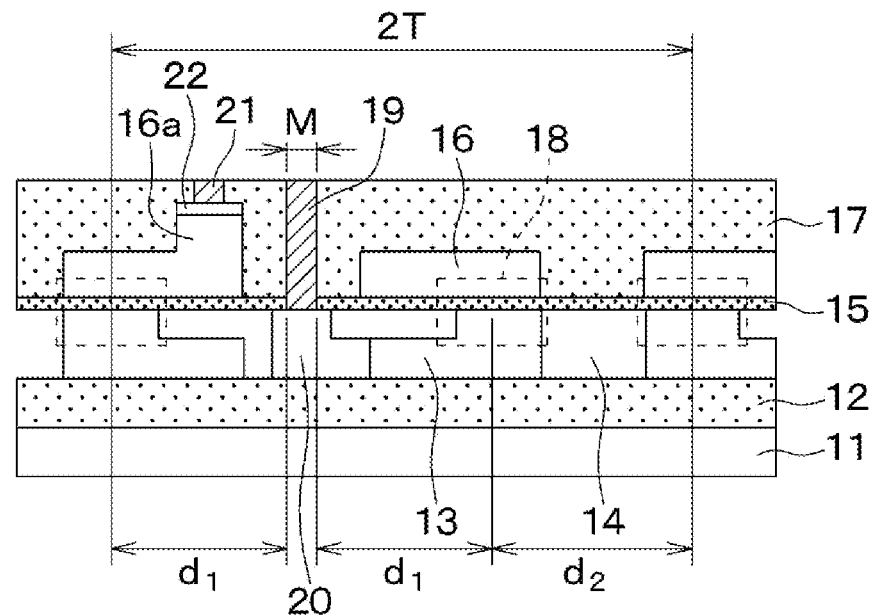
FIG. 11 is a cross-sectional view taken along the line XI-XI in FIG. 10.
Figure 12:
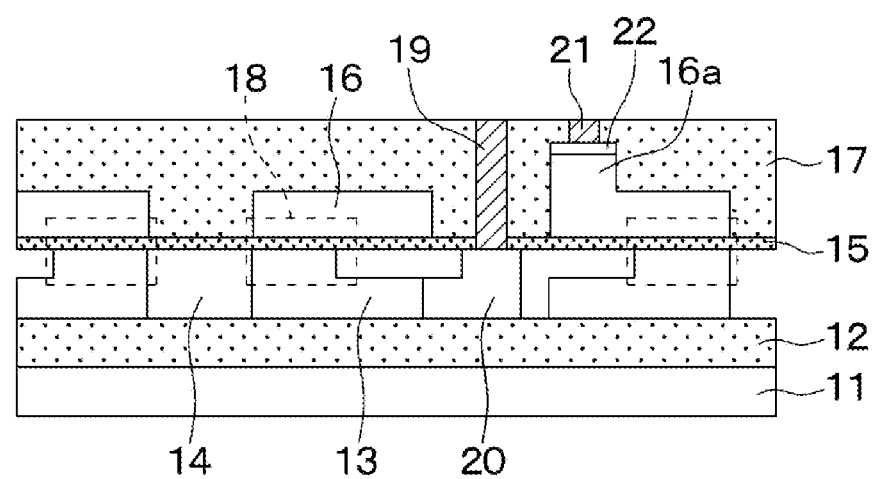
FIG. 12 is a cross-sectional view taken along line XII-XII in FIG. 10.

As illustrated in FIGS. 11, 12, the first n-type contact portion 22a and the second n-type contact portion 22b are arranged to be farther from the substrate 11 than the first waveguide 18a and the second waveguide 18b. In particular, the rib 16a is formed at an end portion of the n-type semiconductor layer 16 at a side opposed to the waveguide 18, and the first n-type contact portion 22a and the second n-type contact portion 22b are formed at a top surface of the rib 16a.

As illustrated in FIG. 10, the contact portions at a single contact regions 1b are arranged in three rows. However, as illustrated in FIGS. 11, 12, the pitch T can be set to satisfy the mathematical relation of $T=d_1+M/2+d_2/2$, by disposing the n-type contact portion 22 at a portion located at a top portion of the waveguide 18 and located between the waveguide 18 and the p-type contact portion 20.

By arranging the contact portions in three rows, it is possible to reduce a set of the width of the first p-type contact portion 20a, the width of the first n-type contact portion 22a, and the width of the second n-type contact portion 22b along the x-direction about a half as compared with the second embodiment.

In the present embodiment, it is possible to attain the advantageous effects as similar to the effects in the first and second embodiments with the configuration and operation identical to the ones in the first and second embodiments.

According to the above embodiment, it is possible to attain the following advantageous effects.

The first p-type contact portion 20a and the second p-type contact portion 20b are alternately aligned along the x-direction. The first n-type contact portion 22a is arranged between the first waveguide 18a and a row of the first p-type contact portion 20a and the second p-type contact portion 20b. The second n-type contact portion 22b is arranged between the second waveguide 18b and a row of the first p-type contact portion 20a and the second p-type contact portion 20b. The first n-type contact portion 22a and the second n-type contact portion 22b are arranged to be farther from the substrate 11 than the first waveguide 18a and the second waveguide 18b.

As the n-type contact portion 22 is arranged at the top portion of the waveguide 18, it is possible to miniaturize the phase shifter 1 by reducing the width of the p-type contact portion 20 and the n-type contact portion 22 along the x-direction while reducing the optical loss caused by the electrode's light absorption by enlarging the distance between the waveguide 18 and the n-type electrode 21.

The width of the n-type semiconductor layer 16 along the y-direction is set, for example, in a range of 500 nanometers to 1000 nanometers, and the thickness of the n-type semiconductor layer 16 is set, for example, in a range of 100 nanometers to 250 nanometers. Even in a case where the thickness is made to be smaller than the width of the n-type semiconductor layer 16, it is possible to enlarge the distance between the waveguide 18 and the n-type electrode 21 by forming the rib 16a and the n-type contact portion 22 above the rib 16a.

Other Embodiments

The present disclosure is not limited to the above-described embodiments, and can be appropriately modified within the scope of the present disclosure. In each of the embodiments, it goes without saying that the elements constituting the embodiments are not necessarily essential except for a case where it is explicitly stated that the elements are particularly essential and a case where the elements are considered to be obviously essential in principle. Further, in each of the above-described embodiments, when numerical values such as the number, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Further, in each of the above embodiments, when the shape of an element or the positional relationship between elements is mentioned, the present disclosure is not limited to the specific shape or positional relationship unless otherwise particularly specified or unless the present disclosure is limited to the specific shape or positional relationship in principle.

In the first to third embodiments, the arrangement of the p-type semiconductor layer 13, the p-type electrode 19, the p-type contact portion 20, the n-type semiconductor layer 16, the n-type electrode 21 and the n-type contact portion 22 may be reversed. In other words, the n-type semiconductor layer 16 may be formed at the top surface of the insulation layer 12, and the p-type semiconductor layer 13 may be formed at the top surface of the insulation layer 15. In the third embodiment, the first n-type contact portion 22a and the second n-type contact portion 22b are alternately aligned in a row along the x-direction. The first p-type contact portion 20a is arranged between the first waveguide 18a and a row of the first n-type contact portion 22a and the second n-type contact portion 22b. The second p-type contact portion 20b is arranged between the second waveguide 18b and a row of the first n-type contact portion 22a and the second n-type contact portion 22b. The first p-type contact portion 20a and the second p-type contact portion 20b are arranged to be farther from the substrate 11 than the first waveguide 18a and the second waveguide 18b.

Figure 13:
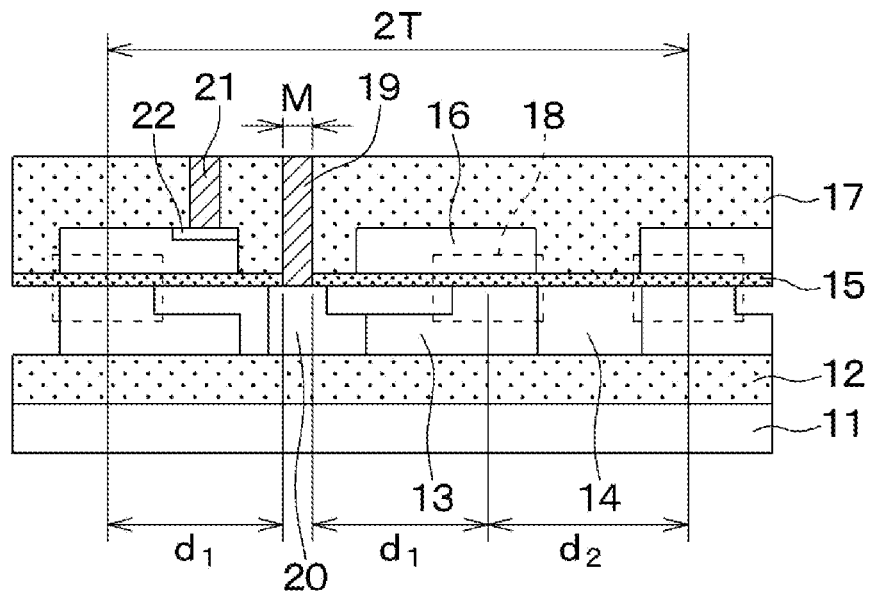
FIG. 13 is a cross-sectional view of a phase shifter according to other embodiments.
Figure 14:
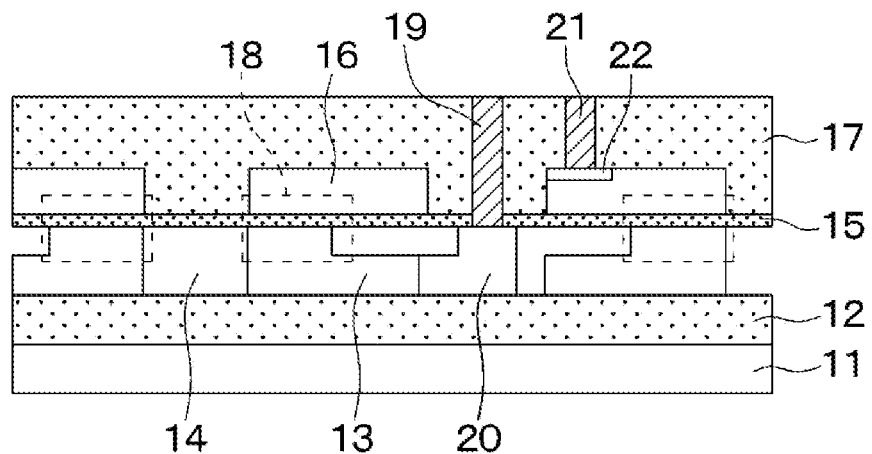
FIG. 14 is a cross-sectional view of a phase shifter according to other embodiments.

In the third embodiment, the rib 16a may not have to be formed at the n-type semiconductor layer 16. As illustrated in FIGS. 13, 14, the top surface of the end portion of the n-type semiconductor layer 16 at a side opposed to the waveguide 18 has a flat shape, and the n-type contact portion 22 may be formed at this end portion of the n-type semiconductor layer 16.

What is claimed is:

1. A phase shifter comprising:
   a substrate including
      a plurality of optical waveguide regions, and
      a plurality of contact regions, each of which has a plurality of contact portions; and
   a plurality of waveguides disposed at the substrate, each of which is configured to accumulate carriers to modulate a phase of light for guiding propagation of the light; and
   a wiring portion configured to electrically connect each of the waveguides and each of the contact portions,
   wherein each of the contact portions connecting one of the waveguides to one of electrodes to inject the carriers into the one of the waveguides,
   wherein each of the waveguides has a lengthwise direction defined as a first direction,
   wherein a direction that is perpendicular to the first direction and parallel to a surface of the substrate is defined as a second direction,
   wherein the optical waveguide regions and the contact regions are disposed to be alternately aligned along the second direction,
   wherein two of the waveguides are disposed at each of the optical waveguide regions, and the two of the waveguides are respectively a first waveguide and a second waveguide,
   wherein the first waveguide is adjacent to one of the contact regions at a side of each of the optical waveguide regions facing the second direction, and the second waveguide is adjacent to another one of the contact regions at another side of each of the optical waveguide regions facing the second direction,
   wherein each of the contact regions includes:
      a first p-type contact portion as one of the contact portions that is made of a p-type semiconductor;
      a first n-type contact portion as one of the contact portions that is made of an n-type semiconductor;
      a second p-type contact portion as one of the contact portions that is made of the p-type semiconductor; and
      a second n-type contact portion as one of the contact portions that is made of the n-type semiconductor,
   wherein the first p-type contact portion and the first n-type contact portion are connected to one of the electrodes to inject the carriers into the first waveguide, and
   wherein the second p-type contact portion and the second n-type contact portion are connected to another one of the electrodes to inject the carriers into the second waveguide.

2. The phase shifter according to claim 1,
   wherein the first p-type contact portion includes a plurality of first p-type contact portions,
   wherein the first n-type contact portion includes a plurality of first n-type contact portions,
   wherein the second p-type contact portion includes a plurality of second p-type contact portions,
   wherein the second n-type contact portion includes a plurality of second n-type contact portions,
   wherein the first p-type contact portions and the first n-type contact portions are alternately aligned in a row along the first direction, and
   wherein the second p-type contact portions and the second n-type contact portions are alternately aligned in a row along the first direction.

3. The phase shifter according to claim 1,
   wherein the first p-type contact portion, the first n-type contact portion, the second p-type contact portion, and the second n-type contact portion are aligned in a row along the first direction and aligned in the following sequential order:
      the first p-type contact portion, the second p-type contact portion, the first n-type contact portion, and the second n-type contact portion.

4. The phase shifter according to claim 1,
   wherein the first p-type contact portion and the second p-type contact portion are alternately aligned in a row along the first direction, as a row of the first p-type contact portion and the second p-type contact portion,
   wherein the first n-type contact portion is disposed between the first waveguide and the row of the first p-type contact portion and the second p-type contact portion,
   wherein the second n-type contact portion is disposed between the second waveguide and the row of the first p-type contact portion and the second p-type contact portion, and
   wherein the first n-type contact portion and the second n-type contact portion are disposed at respective positions farther from the substrate than the first waveguide and the second waveguide.

5. The phase shifter according to claim 1,
   wherein the first n-type contact portion and the second n-type contact portion are alternately aligned in a row along the first direction, as a row of the first n-type contact portion and the second n-type contact portion,
   wherein the first p-type contact portion is disposed between the first waveguide and the row of the first n-type contact portion and the second n-type contact portion,
   wherein the second p-type contact portion is disposed between the second waveguide and the row of the first n-type contact portion and the second n-type contact portion, and wherein the first p-type contact portion and the second p-type contact portion are disposed at respective positions farther from the substrate than the first waveguide and the second waveguide.

6. The phase shifter according to claim 1,
wherein the wiring portion has a section connecting the waveguides, the first p-type contact portion and the second p-type contact portion, and
wherein the section is made of p-type silicon or p-type silicon germanium.

7. The phase shifter according to claim 1,
wherein the wiring portion has a section connecting the waveguides, the first n-type contact portion, and the second n-type contact portion, and
wherein the section is made of an n-type III-V compound semiconductor.

8. The phase shifter according to claim 7,
wherein the section is made of indium phosphide or indium gallium arsenide phosphide as the n-type III-V compound semiconductor.

9. The phase shifter according to claim 1,
wherein the wiring portion has a section connecting the waveguides, the first n-type contact portion, and the second n-type contact portion, and
wherein the section is made of n-type silicon.

10. The phase shifter according to claim 1,
wherein each of the waveguides is a rib waveguide.

11. The phase shifter according to claim 10, further comprising;
a clad layer configured to separate the waveguides,
wherein the clad layer is an air clad.

12. The phase shifter according to claim 1,
wherein each of the waveguides includes the p-type semiconductor, the n-type semiconductor, and an insulation layer disposed between the p-type semiconductor and the n-type semiconductor.

* * * * *